(12) United States Patent
Kallio et al.

(10) Patent No.: US 7,733,909 B2
(45) Date of Patent: Jun. 8, 2010

(54) CONTENT DELIVERY

(75) Inventors: Jarno Kallio, Turku (FI); Kari Virtanen, Turku (FI)

(73) Assignee: Nokia Corporation, Espoo (FI)

( * ) Notice: Subject to any disclaimer, the term of this patent is extended or adjusted under 35 U.S.C. 154(b) by 2215 days.

(21) Appl. No.: 10/366,404

(22) Filed: Feb. 14, 2003

(65) Prior Publication Data

US 2003/0200328 A1 Oct. 23, 2003

(30) Foreign Application Priority Data

Feb. 14, 2002 (GB) ................... 0203538.4

(51) Int. Cl.
*H04J 3/17* (2006.01)
*G08C 17/00* (2006.01)

(52) U.S. Cl. .............. 370/473; 370/311; 340/7.34; 455/343.2

(58) Field of Classification Search ......... 370/347, 370/441, 442, 351, 352, 465, 318, 321, 337, 370/338, 466, 468, 470–476, 517, 529, 235–236, 370/311; 455/13.4, 343.1–343.6; 713/324; 709/106; 725/90, 93–97, 114–117, 138, 725/144–147; 340/7.32, 7.34, 7.38
See application file for complete search history.

(56) References Cited

U.S. PATENT DOCUMENTS

| | | | | | |
|---|---|---|---|---|---|
| 71 | A | * | 10/1836 | Smith ......................... | 126/4 |
| 5,333,135 | A | * | 7/1994 | Wendorf .................... | 370/394 |
| 5,382,949 | A | * | 1/1995 | Mock et al. ................ | 340/7.28 |
| 5,909,640 | A | * | 6/1999 | Farrer et al. ............... | 455/63.1 |
| 5,928,330 | A | * | 7/1999 | Goetz et al. ................ | 709/231 |
| 5,987,030 | A | | 11/1999 | Brockhage et al. | |
| 6,738,379 | B1 | * | 5/2004 | Balazinski et al. ......... | 370/394 |
| 6,807,159 | B1 | * | 10/2004 | Shorey et al. .............. | 370/318 |
| 6,891,852 | B1 | * | 5/2005 | Cloutier et al. ............ | 370/468 |
| 6,907,028 | B2 | * | 6/2005 | Laiho et al. ................ | 370/347 |
| 6,954,432 | B1 | * | 10/2005 | Bychowsky et al. ....... | 370/236 |
| 6,993,042 | B1 | * | 1/2006 | Akatsuka et al. ........... | 370/447 |
| 7,049,954 | B2 | * | 5/2006 | Terry ...................... | 340/539.1 |
| 7,100,078 | B1 | * | 8/2006 | Pass .......................... | 714/18 |
| 7,215,679 | B2 | * | 5/2007 | Pugel ........................ | 370/412 |
| 2002/0091956 | A1 | * | 7/2002 | Potter et al. ................ | 713/324 |
| 2002/0136231 | A1 | * | 9/2002 | Leatherbury et al. ....... | 370/442 |

FOREIGN PATENT DOCUMENTS

EP 0 609 936 A2 10/1994
WO WO 01/76189 A 10/2001

* cited by examiner

*Primary Examiner*—Aung S Moe
*Assistant Examiner*—Habte Mered
(74) *Attorney, Agent, or Firm*—Banner & Witcoff Ltd.

(57) ABSTRACT

A method and apparatus are disclosed whereby a time-slicing approach to the delivery of packet data is enabled. The approach is particularly suited to enabling power management by mobile terminals where receiver demands otherwise place strenuous requirements on an internal power source such as a battery.

28 Claims, 4 Drawing Sheets

CONTENT DELIVERY

BACKGROUND OF THE INVENTION

1. Field of the Invention

The present invention relates to the content delivery utilizing Internet Protocol (1P) networking, particularly, although not exclusively data networks.

2. Description of the Prior Art

Wireless IP networks, and particularly mobile wireless IP networks typically include a terminal having stringent power requirements. Such a mobile terminal may be required to operate for lengthy periods on an internal source of power. In the case of simplex wireless IP networks exemplified by the Digital Video Broadcast (DVB) terrestrial (DVB-T) and satellite (DVB-S) networks, typically a large part of the energy requirement of a terminal is due to the demands of a receiver necessary to receive transmissions carrying a range of content.

It is the case, however, that a user of the terminal may at an application level, as set out in the well-known Open System Interconnect (OSI) model, make a selection of particular content from the range of content presently received by the terminal. Although such a selection may take place in a unicast environment, that is a one to one transmission, more typically the content is distributed in a one to many transmission, that is a multicast environment.

A well-known mechanism for facilitating the delivery of content in a multicast environment is provided by the Session Announcement Protocol (SAP), details of which are set out in RFC2974 published by the Internet Engineering Task Force (IETF repository at http://www.ietf.org) and the Session Description Protocol (SDP), details of which are to be found in RFC2327 published by the Internet Engineering Task Force (IETF repository at http://www.ietf.org) which are incorporated herein by reference in their entirety. In summary, an Application Programming Interlace (API) is provided which facilitates communication between applications over an IP protocol. The API listens at a particular address for information identifying available streams of content, so-called services. The information provided at that address is then provided to an application, a browser for example, which in turn uses the API to access a selected stream by opening a socket at which the selected stream can be heard. Typically, the selection of the desired content is made by a user via the browser, i.e. by clicking on a particular link.

SUMMARY OF THE INVENTION

According to a first aspect of the present invention, there is provided a packet data transmission method, the method comprising receiving a content stream containing packets and dividing the packets into a sequence of sets of packets and for each set of packets in the sequence generating a transmission burst, wherein a field in each packet of a set includes a value indicative of a time offset to the generation of a further transmission burst containing a next set of packets in the sequence.

Such a transmission method facilitates a time-slicing approach to the delivery of packet data over IP networks, particularly wireless networks such as those now being utilized for the delivery of digital television and the like. Such a method is particularly suited to the delivery of data including multimedia content to mobile clients or terminal over such networks. Preferably, the method allows a head-end to receive multiple streams of content or services and thereby take advantage of the broad bandwidth and high data rates of such networks. The method is particularly suitable for use with the IPv6 protocol which is intended to include within the standard header space fields such as a flow_label field suitable for providing the timing and optionally grouping information for a burst. Each burst contains sufficient information to allow the burse to be recognized by a receiving client (hereinafter a terminal). Typically, the identification is provided by an IP address and a flow_label value containing at least the time offset. It is recognized that some information pointing towards the IP address or some other identify may be added to the flow_label value so as to identifier a packet and in particular to allow it to be associated with a particular content or service stream.

Preferably, the method is applied to the delivery of data over a simplex broadcast network such as a broadband digital broadcast network. The method may be carried out entirely within the network head-end, in which case the generation of a value of the time offset may be carried out entirely within parameters set by the network operator. Alternatively, the content provider may apply the method to content before delivery of a content stream to the head-end of the transmission network.

Preferably, the method allows the re-transmission of packets in so-called copy bursts, that is bursts containing substantially the same packets as originally transmitted, so-called original bursts. In this transmission environment, the offset time held in packets of copy bursts will decrease as the burst generation time of the next original burst approaches.

According to a further aspect of the invention, there is provided a packet data reception method, the method comprising receiving a plurality of transmission bursts, extracting a set of packets from each burst, each packet including a first field having a value indicative of a sequence of sets of packets and a second field indicative of a time offset to the generation of a transmission burst containing a next set of packets in the sequence, analyzing each of the extracted packets and identifying firstly a packet where a change in the first field to a predetermined value is detected and storing this and any subsequent packet with the same first field until such time as a further change in the first field value is detected whereupon reception of transmission bursts is suspended for the time offset identified from the second field value.

The reception method facilitates the delivery of multiple services or content for consumption by a terminal. The method seeks to facilitate robust error correction in that conveniently additional copy bursts may be received to allow replacement of erroneous packets. In addition, the burst nature of the transmission method coupled with the timing information regarding the delivery of original bursts permits power management of the terminal functions. Thus, power intensive features of the terminal such as the broadband receiver circuitry may be powered down during periods where no burst is expected. Other power saving opportunities provided by the method include suspending processing requirements related to the identification of burst boundaries, a burst boundary being the change in the IP address or other sequence identifier between packets delivered in a stream as extracted from received bursts.

It should be noted that either of the above two aspects of the invention may be implemented as software, hardware, or a combination of the two, as would be apparent to those skilled in the art.

BRIEF DESCRIPTION OF THE DRAWINGS

In order to assist in understanding the invention, an embodiment thereof is described by way of example and with reference to the accompanying drawings, in which.

DESCRIPTION OF THE PREFERRED EMBODIMENTS

Figure 1:
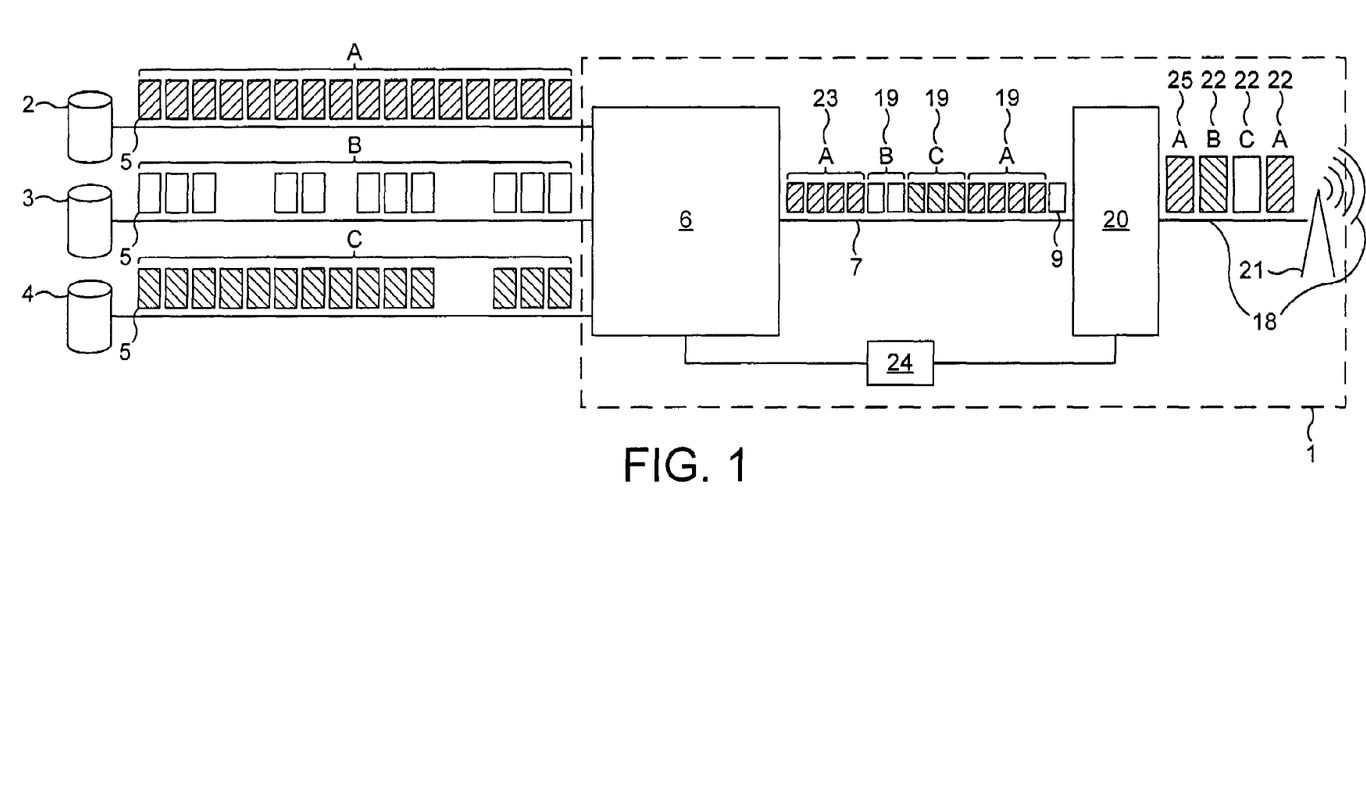
FIG. 1, is a diagram illustrative of a transmission method in accordance with a first aspect of the present invention.

Referring to FIG. 1, there is shown a broadband digital broadcast head-end 1 connected to a variety of sources 2, 3, 4 of content A, B, C which content or service is delivered to the head-end in the form of packets 5 of data, these packets having been generated in accordance with Version 6 of the Internet Protocol (IPv6) details of which may be found in RFC26O published by the Internet Engineering Task Force (IETF) and available at www.ietf.orq which is incorporated herein by reference in its entirety. Thus, each packet includes a flow_label field to facilitate the handling by the Internet infrastructure of particular so-called flows of related packets. The flow_label itself forms part of the IPv6 header and is a 20 bit field having a default value of zero. Further details of the flow_label as originally proposed may be found in RFC 2460 published by the IETF and available at www.ietf.org. Each source of content A, B, C is encapsulated by a packet data processor 6 at the head end 1 and placed into a transport stream 7 where the content A, B, C is multiplexed with the other content similarly encapsulated at the head-end 1 by the packet data processor 6. As will be described in more detail below, multicast and optionally unicast may include a non-zero flow_label field within the IPv6 header. The transport stream 7 further includes packets 9 providing time stamp information and control data identifying content in the stream 7. Other mechanisms for placing content into the transport stream 7 include, data piping, data streaming, and the use of data and object carousel. Such mechanisms are known, in the case of digital broadcast television, for example, from the Digital Video Broadcast (DVB) Project which describes one particular broadband digital broadcast solution using MPEG-2 to which the invention is applicable.

The content can include the delivery of Internet services via the transmission channel 18. Such services may be unicast, in the sense that they are a one to one provision of content or multicast in the sense that they are a one to many provision of content. In IP terms, a multicast address is differentiated from a unicast address by inspecting the most significant byte. A particular block of IP addresses are dedicated to use by multicast services namely 224.0.0.0 to 239.255.254.0 using the dotted decimal notation known from IPv4. In the case of IPv6, further details of which may be found from RFC2375 published by the IETF which is incorporated and available for the time being from www.ietf.org), multicast addresses are in the format FFAB where FF is the multicast identifier, A indicates whether the address is permanent or temporary and B provides the scope of the address. Thus, where a service is intended to be multicast, the service must ensure that an address from this block is utilized in the destination address portion of each IP packet.

Returning to the operation of the head-end 1, the packet data processor 6 having received the streams A, B, C of data corresponding to content or a service 2,3,4 divides each stream of packets into a sequence of discrete sets of packets for transmission at a selected time. The sets of packets 19 which have been divided in this manner are passed to a burst generator 20 which generates a high-bandwidth low-duration original burst 22 for transmission by a transmitter portion 21 of the head-end 1. Each original burst 22 contains data from a single IP address corresponding to the content or a service 2,3,4. The packet data processor 6 is further operable to generate a copy 23 of a set of packets which together make up a particular original burst 22 when so instructed by a controller 24. Again, copy set of packets 23 contains data from a single IP address corresponding to the content or service 2,3,4. This copy 23 of a set of packets is then passed to the burst generator 20 which, as before, generates a high-bandwidth low-duration burst for re-transmission as a copy burst 25 by the transmitter portion 21 of the head end 1. The copy bursts 25 are also transmitted at selected times which times are arranged such that bursts, whether an original or a copy and containing packets from a particular stream of data corresponding to content or service 2,3,4 do not collide either with another burst containing packets in that stream or another stream currently being transmitted by the head-end 1.

Figure 2:
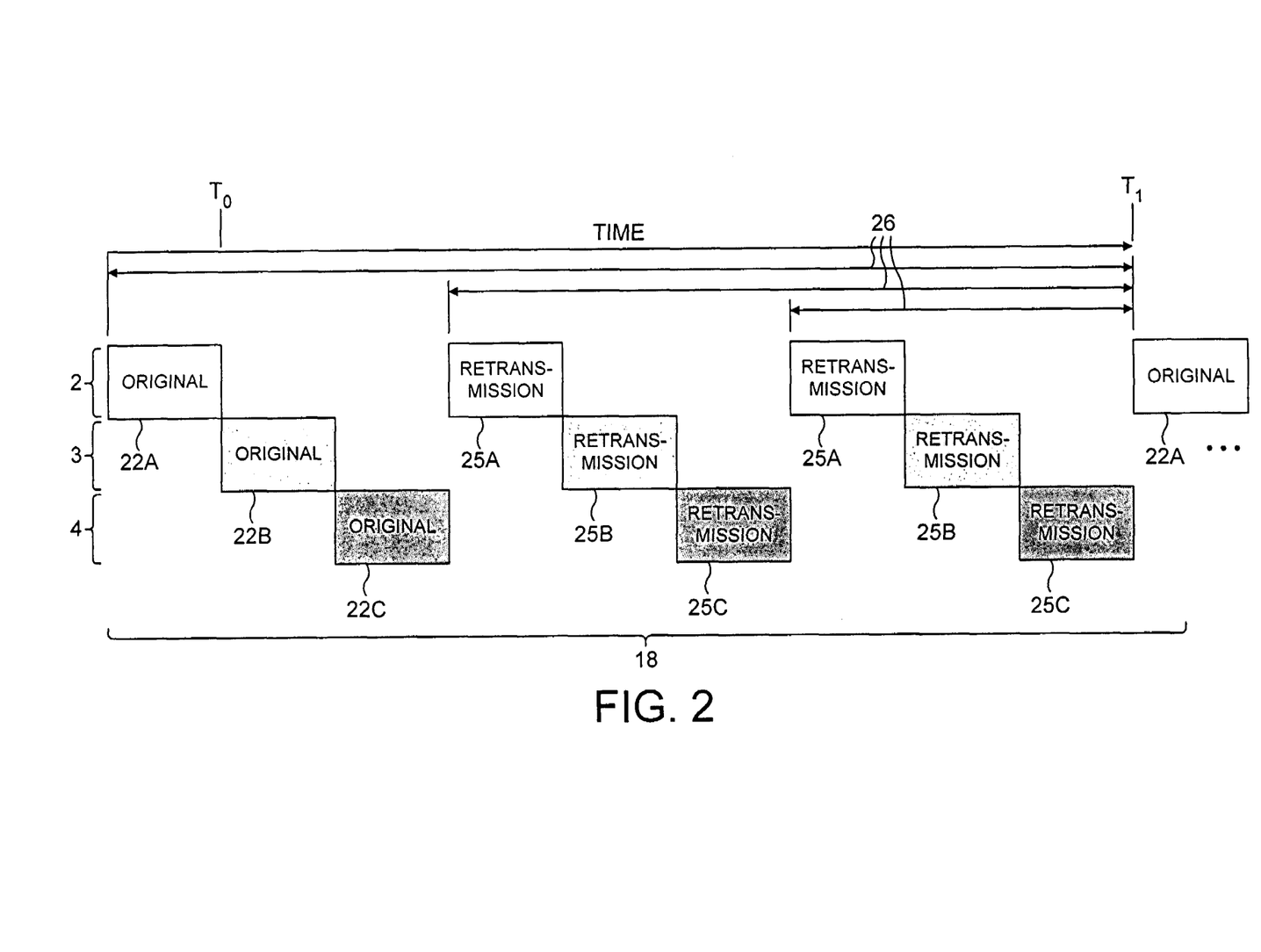
FIG. 2, is a diagram showing in more detail a transmission channel of the method of FIG. 1.

With reference to FIG. 2, in order to facilitate reception of a particular service or content 2,3,4 in such a transmission channel 18 where multiple bursts containing the same packets are transmitted, namely an original burst 22 and one or more copy bursts 25, in addition to dividing each packet stream into a sequence of discrete sets of packets, the packet data processor 6 also introduces a non-zero value into a flow_label field of every packet in each set which ultimately comprise a burst, whether an original or a copy burst 22,25. The value introduced into the flow_label field of each packet in a set from which a burst is formed, is a time offset 26 which provides the time interval from the start of the burst which includes that packet to the start of the next original burst in the sequence of bursts making up that particular content or service. Where a service is discontinued, there are no further bursts having the same IP address, at least until a pre-determined timeout or guard interval has expired before a new service may start from that address. In this situation, the offset is set to a maximum value or another predetermined value indicative of the service being discontinued.

The channel 18 is received by a set of terminals which in the case of a satellite system fall under the satellite footprint, while in the case of a terrestrial system, the receiving terminals fall within areas of transmission coverage of a transmitter network. Each terminal, which includes a mobile terminal 10, is typically under the control of a user at least as far as she is able to select particular content from that currently being transmitted in the transport stream 7. The mobile terminal 10 shown in FIG. 3, includes an internal power supply 12, such as a rechargeable battery supplying power to a controller 13, user interlace 14 and a receiver 15. The terminal 10 also incorporates both memory 16 and storage 17 necessary to execute applications and -consume content. A fixed terminal may, of course, dispense with the requirement for a internal source of power.

Figure 3:
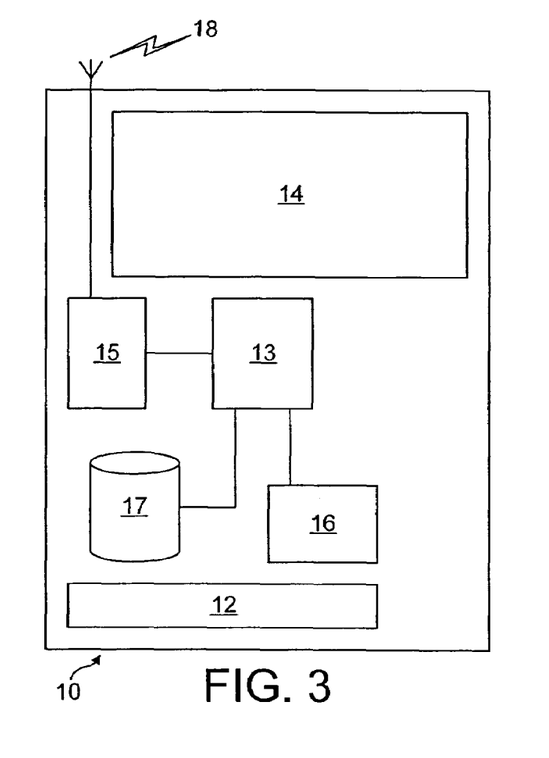
FIG. 3, is a diagrammatic view of a terminal operable in accordance with a method of reception according to a second aspect of the present invention, shown receiving the transmission channel of FIG. 2.

The receiver 15, as has been mentioned, has a proportionally larger power consumption than the other components of the terminal 10. In order to minimize drain on the internal power supply 12, the receiver 15 may be switched on and off in response to instructions received from the controller 13. The receiver 15, when in operation, receives the channel 18 over the air, in the case of satellite or terrestrial transmission. The operation of the receiver is such that over a predetermined and possibly variable service period, say 60 seconds, the receiver 15 is capable of being switched into operation for one or more periods of time determined by the accuracy of a receiver clock forming part of the controller 13. For example, where the receiver clock accuracy can be maintained at 234 milliseconds, each period may last for 234.375 milliseconds there being 256 such periods within the aforementioned 60 second service period.

Figure 4A:
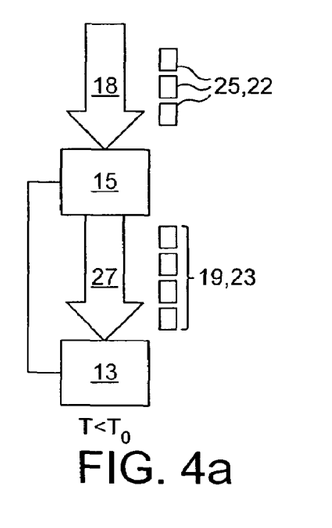
FIGS. 4a, 4b and 4c, are views illustrative of packet flows in the terminal of FIG. 3.
Figure 4B:
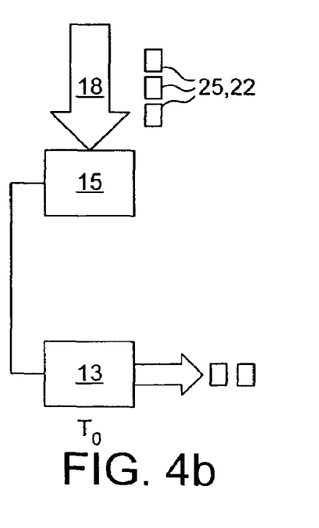
Figure 4C:
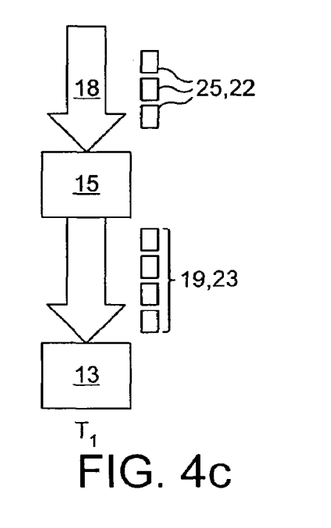
Figure 5:
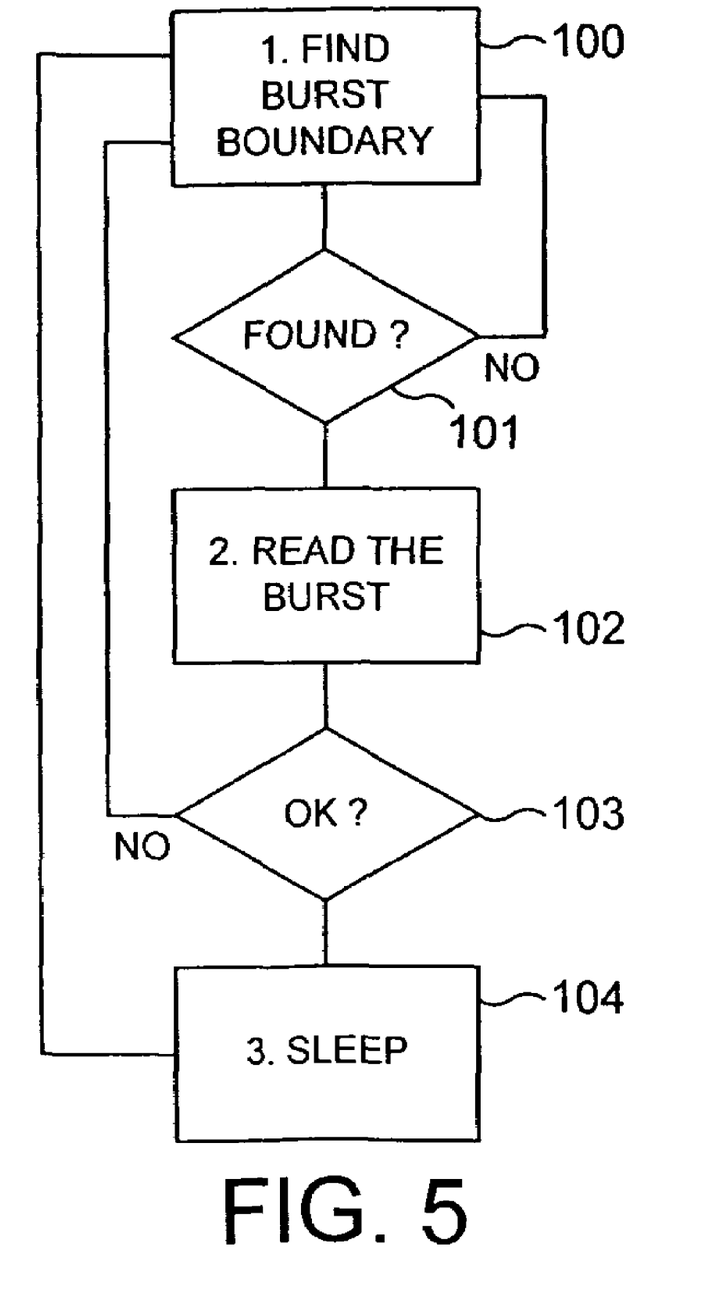
FIG. 5, is a flow chart useful in understanding the reception method of FIG. 3.

The controller 13 is operable to switch the receiver 15 between on and off states in response to the offset determined from the flow_label field as further described below with additional reference to FIGS. 4 and 5.

Thus, the receiver 15 is operable to receive bursts transmitted by the head-end 1. Of course, the head-end 1 transmits bursts corresponding to a range of services and content 2,3,4. The receiver 15 extracts packets from each burst 22,25 it receives and the resulting sets of packets 19,23 are placed into a stream 27 which is analyzed by the controller 13. The controller 13 analyzes packets 22,25 in the stream 27 by determining the IP address and flow_label field values from the header of each packet. The controller 13 seeks 100 to identify a change from one IP multicast address to another IP multicast address which corresponds to content or a service which the terminal 10 wishes to consume. A change in IP address identifies a burst boundary, that is the beginning of a set of packets in the stream 27, which have been placed in the same burst 19,23 at the head-end 1.

Thus, where a boundary is identified 101, the controller determines whether the IP address of the another IP multicast address corresponds to an address of content or a service to be consumed by the terminal 10. If the another IP multicast address does indeed correspond then the controller, having identified such a boundary, further determines the flow_label field value in each packet header. This value remains constant for each packet forming part of the same burst because it is a value indicative of the time offset 26 to the next original burst in the sequence of bursts making up that particular service 2,3,4. The controller 13 thereafter stores each packet it identifies as having the same IP address and offset value 26. It is recognized that the duration of each burst 22,25 (although not shown as such on FIG. 2 in particular) may be varied and correspondingly the number of packets contained in a burst need not be constant as the controller 13 only stops storing packets from a burst once a change is detected in the IP address and/or flow_label value. Once such a change has been detected, the controller 13 initiates an error check 103 of the stored packets. Depending on the outcome of this error check, the controller takes one of two steps. Where errors are detected, the controller marks those packets containing errors and continues to analyze the stream of packets 27 being extracted by the receiver 15 for a burst boundary indicative of a copy burst 25 corresponding to the burst 22,25 which delivered the packets presently in storage, namely the controller again seeks to identify a burst having the same IP address but note that the time offset 26 will be reduced. Providing such a burst exists and is detected by the controller 13, the controller 13 stores the packets from the copy burst and carries out an error analysis before replacing any bad packets in the first received burst with packets from the copy burst. Such a process is repeated until the time-offset 26 has expired in which case a new original burst having the same IP address should be detected unless the service is discontinued.

In a second non-illustrated variant, rather than replace individual packets, the entire set of packets from the first burst is discarded and replaced by the packets extracted from a copy burst. This process is repeated until either all packet errors have been corrected or the next original burst in the sequence is received by the terminal in which case the packets from the last original burst may either be flushed from storage or passed with or without the marked up bad packets to a terminal application for consumption.

Where all the packet errors have been corrected or alternatively the time offset is about to expire, then the process moves to the second outcome namely the process followed where the error check 103 of the stored packets reveals no errors. Thus, the packets are marked as valid by the controller 13 and are passed for consumption at the application level by the terminal 10. However it is conceivable that in some circumstances, it may not be desirable to forward partial bursts, that is bursts containing some errors, for consumption by the terminal. In which case, the controller simply drops the partial burst. At the same time, the controller 13 instructs the receiver 15 to shut down such that no more packets are extracted from incoming bursts 22,25 in the channel 18 with the result shown in FIG. 4b that no packet stream 27 is delivered to the controller 13. The controller 13 however remains active and ready to instruct the receiver 15 to power up in anticipation of receiving (FIG. 4c) the next original burst 22 in the sequence of- bursts making up the particular content or service 2,3,4. The time period for which the receiver is shut down is determined, of course, from the flow_label field value namely the offset 26 derived from those valid packets extracted from the current burst. The controller 13 utilizes the offset 26 to determine the time at which the receiver should be powered up ready to receive the next original burst in the sequence of packets making up the content or service. It may well be the case that the receiver 15 should be powered up some time in advance of the expiry of the time offset period to ensure that packets can be reliably extracted from the incoming channel 18.

By way of further explanation, where consumption of different content is desired, the controller 13 is simply provided with the IP address of the content or service 2,3,4 which is now desired. As is apparent from FIG. 4c in particular, the receiver 15 extracts packets from a number of bursts 22,25 containing packets of several content or service streams A,B,C delivered to the head-end 1 from their respective sources 2,3,4. It may well also be the case that the receiver 15 is powered off as a consequence of the last offset value 26 derived by the controller 13. In this event, the controller 13 may immediately power up the receiver 15 following the receipt of instructions to consume a new service or content. Alternatively, the receiver 15 may remain powered down until the time at which the controller causes the receiver to power up to commence receiving the next original burst of what was the previously desired content. In this case, the controller, rather than identify and store packets corresponding to the previously desired content, instead continues analyzing the packet flow until a burst-boundary is detected for a burst 22, containing the newly selected content or service packets 19,23.

The invention claimed is:

1. A computer implemented method comprising:
   receiving content in the form of packets, and
   dividing, by a computer, the packets into a sequence of sets of packets comprising a sequence of sets of original packets,
   for each set of packets in the sequence, generating a transmission burst, wherein a field in each packet of a set includes a value indicative of a time offset to the generation of a further transmission burst containing a next set of packets in the sequence,
   generating a copy of a set of original packets, and
   generating at least one transmission burst for said copy, wherein a field in each packet of said copy includes a value indicative of a time offset to the generation of a further transmission burst containing a next of original packets in the sequence.

2. A computer implemented method as claimed in claim 1, wherein the sequence is such that sets of packets are generated as transmission bursts in an order that sets of packets are received in a content stream.

3. A computer implemented method as claimed in claim 1, wherein separate sequences of sets of packets are generated as transmission bursts for respective ones of a plurality of received content streams.

4. A computer implemented method as claimed in claim 1, wherein the field additionally contains a value indicative of a sequence of sets of packets.

5. A computer implemented method as claimed in claim 1, wherein the packet includes a field having a value indicative of a sequence of sets of packets.

6. A computer implemented method as claimed in claim 4, wherein the value indicative of a sequence of sets of packets is a multicast address.

7. A computer implemented method as claimed in claim 1, wherein the time offset value of a packet is calculated utilizing a transmission generation time of the burst which includes the packet and the transmission generation start time of the transmission burst containing the next set of packets in the sequence.

8. A computer implemented method as claimed in claim 1, wherein the packets are received in a content stream.

9. A computer readable non-transitory medium comprising computer executable code, when executed on a computer, cause the computer to carry out the method according to claim 1.

10. An apparatus comprising:
a processor configured to
receive content in the form of packets, and
divide the packets into a sequence of sets of packets comprising a sequence of sets of original packets, and
generate a copy of a set of original packets of said sequence of sets of original packets; and
a burst generator configured to:
generate a transmission burst for each set of packets in the sequence,
wherein a field in each packet of a set includes a value indicative of a time offset to the generation of a further transmission burst containing a next set of packets in the sequence, and
generate at least one transmission burst for said copy, wherein a field in each packet of said copy includes a value indicative of a time offset to the generation of a further transmission burst containing a next set of original packets in the sequence.

11. An apparatus as claimed in claim 10, wherein the burst generator is configured to generate transmission bursts in an order that sets of packets of a sequence are received.

12. An apparatus as claimed in claim 10, wherein the burst generator is configured to generate transmission bursts for separate sequences of sets of packets corresponding to separate received content streams.

13. An apparatus as claimed in claim 10, wherein the field additionally contains a value indicative of a sequence of sets of packets.

14. An apparatus as claimed in claim 13, wherein the value indicative of a sequence of sets of packets is a multicast address.

15. An apparatus as claimed in claim 10, wherein the time offset value of a packet reflects a transmission generation time of the burst which includes the packet and the transmission generation start time of the transmission burst containing the next set of packets in the sequence.

16. A computer implemented method comprising:
receiving a plurality of transmission bursts,
extracting, by a computer, a set of packets from each burst, each packet including a first field having a value indicative of a sequence of sets of packets and a second field indicative of a time offset to the generation of a transmission burst containing a next set of packets in the sequence,
analyzing, by the computer, each of the extracted packets,
identifying first a packet where a change in the first field to a predetermined value is detected and storing the packet and any subsequent packet with a same first field until such time as a further change in the first field value is detected whereupon reception of transmission bursts is suspended for the time offset identified from the second field value wherein the plurality of transmission bursts comprise transmission bursts corresponding to sets of original packets and transmission bursts corresponding to copies of sets of original packets, and the sequence of sets of packets comprises a sequence of sets of original packets such that the second field is indicative of a time offset to the generation of a transmission burst containing a next set of original packets.

17. A computer implemented method as claimed in claim 16, wherein the suspension of reception is conditional upon detection of no errors in the stored packets such that where an error exists in the stored packets, the analysis of the extracted packets is continued for packets having a first field corresponding to the predetermined value.

18. A computer implemented method as claimed in claim 17, wherein the stored packets are replaced by one or more packets obtained from the continued analysis.

19. A computer implemented method as claimed in claim 16, wherein at least one of the following steps of extraction, analysis and storage is suspended together with the reception during the time offset.

20. A computer implemented method as claimed in claim 16, wherein the field value indicative of a sequence of sets of packets is a multicast address.

21. A computer implemented method as claimed in claim 16, wherein the time offset value of a packet corresponds to a time difference calculated from a transmission generation time of the burst which includes the packet and a transmission generation start time of the transmission burst containing the next set of packets in the sequence.

22. A computer readable non-transitory medium comprising computer executable code, when executed on a computer, cause the computer to carry out the method according to claim 16.

23. An apparatus comprising:
a receiver configured to
receive a plurality of transmission bursts, and
extract a set of packets from each burst, each packet including a first field having a value indicative of a sequence of sets of packets and a second field indicative of a time offset to the generation of a transmission burst containing a next set of packets in the sequence; and
a controller configured to
analyze each of the extracted packets, and
identify a packet where a change in the first field to a predetermined value is detected, and
store the packet and any subsequent packet with a same first field until such time as a further change in the first field value is detected whereupon reception of transmission bursts is suspended for the time offset identified from the second field value, wherein the plurality of transmission bursts comprise transmission bursts corresponding to sets of original packets and transmission bursts corresponding to copies of sets of original packets, and the sequence of sets of packets comprises a sequence of sets of original packets such that the second field is indicative of a time offset to the generation of a transmission burst containing a next set of original packets.

24. An apparatus as claimed in claim 23, wherein the controller is configured to suspend reception upon detection of no errors in the stored packets and is further configured, when an error exists in the stored packets, to continue the analysis of the extracted packets for packets having a first field corresponding to the predetermined value.

25. An apparatus as claimed in claim 24, wherein the controller is configured to replace the stored packets with one or more packets obtained from the continued analysis.

26. An apparatus as claimed in claim 23, wherein the controller is configured to suspend at least one of extraction, analysis and storage together with the reception during the time offset.

27. An apparatus as claimed in claim 23, wherein the field value indicative of a sequence of sets of packets is a multicast address.

28. An apparatus as claimed in claim 23, wherein the time offset value of a packet corresponds to a time difference calculated from a transmission generation time of the burst which includes the packet and a transmission generation start time of the transmission burst containing the next set of packets in the sequence.

* * * * *

UNITED STATES PATENT AND TRADEMARK OFFICE
CERTIFICATE OF CORRECTION

| | | |
|---|---|---|
| PATENT NO. | : 7,733,909 B2 | Page 1 of 1 |
| APPLICATION NO. | : 10/366404 | |
| DATED | : June 8, 2010 | |
| INVENTOR(S) | : Jarno Kallio et al. | |

It is certified that error appears in the above-identified patent and that said Letters Patent is hereby corrected as shown below:

Column 7, Claim 1, Line 2:
    Please delete "next of" and insert --next set of--.

Column 7, Claim 10, Line 35:
    Please delete "and".

Signed and Sealed this
Fourth Day of January, 2011

David J. Kappos
*Director of the United States Patent and Trademark Office*